United States Patent [19]

Boivie

[11] Patent Number: 5,652,497

[45] Date of Patent: Jul. 29, 1997

[54] RECONDITIONING LEAD ACID BATTERIES FOR OPTIONAL USE IN A REVERSE OPERATIONAL MODE

[76] Inventor: Henrik I. Boivie, 2094 Carmel Street, San Miguel Village, Makati, Philippines

[21] Appl. No.: 372,817

[22] Filed: Dec. 23, 1994

[51] Int. Cl.$^6$ ........................................................ H02J 7/00
[52] U.S. Cl. ............................... 320/4; 320/5; 320/48
[58] Field of Search ........................ 320/3, 4, 5, 22, 320/30, 48

[56] References Cited

U.S. PATENT DOCUMENTS

| 3,457,488 | 7/1969 | Chodosh | 320/4 X |
| 4,691,158 | 9/1987 | Hashimoto et al. | 320/4 X |
| 4,728,877 | 3/1988 | Adamson | 320/4 X |
| 5,463,304 | 10/1995 | Winters | 320/4 |

FOREIGN PATENT DOCUMENTS

| 616409 | 9/1994 | European Pat. Off. | 320/4 |

OTHER PUBLICATIONS

Hallows, "Reactivating the Dry Cell," *Wireless World*, Aug. 1953, pp. 344–347.
*McGraw–Hill Encyclopedia of Science & Technology* (6th ed. 1987), vol. 2, "Battery", pp. 429–430.
*McGraw–Hill Encyclopedia of Science & Technology* (6th ed. 1987), vol. 14, "Primary Battery", pp. 256–257.
*McGraw–Hill Encyclopedia of Science & Technology* (6th ed. 1987), vol. 17, "Secondary Battery", pp. 443–449.

*Primary Examiner*—Edward Tso
*Attorney, Agent, or Firm*—Merchant, Gould, Smith, Edell, Welter & Schmidt

[57] ABSTRACT

A secondary battery, such as a lead-acid or Ni-Cd battery which is normally operable in a first operational mode is treated for operation in a second operational mode. Thereafter the treatment can be effected again so that the battery can be operated in a manner similar to the first mode. This procedure can be repeated. The treatment comprises applying a charging current to the respective battery terminals such that a voltage for applying the charging current is directed so that a positive terminal of a charging input is applied to the first cathode terminal, and a negative terminal of the charging input is applied to the first anode terminal. The first cathode terminal is established as a second anode terminal and the first anode terminal is established as a second cathode terminal for operation of the battery on a load in the second operational mode.

39 Claims, 4 Drawing Sheets

RECONDITIONING LEAD ACID BATTERIES FOR OPTIONAL USE IN A REVERSE OPERATIONAL MODE

BACKGROUND

Having a method and means for efficiently charging and recharging secondary batteries, such as lead-acid batteries, is highly desirable.

This invention relates to batteries such as lead-acid batteries. In particular the invention relates to repetitively charging such batteries to permit for effective and efficient reusage.

THE SECONDARY BATTERY

Secondary batteries, such as lead-acid batteries, have been in use since Napoleon's time. A secondary battery is a storage battery or accumulator, namely a battery, that can be recharged. Today, these batteries are an integral part of daily life throughout the world. The practicality of the lead-acid battery is that it is relatively inexpensive to manufacture, will accept a strong charge, which can produce a powerful current, namely cranking power, when discharged and requires little or no maintenance.

A drawback of such batteries is their limited useful lifespan; typically between six months to four years. A common belief is that the short life is due to internal deterioration of the lead plates which constitute the electrodes for the battery.

The cathode electrode or plate, namely the negative plate, does not generally deteriorate, as it is covered by protective lead sulfite (PbS) and/or lead sulfate ($PbSO_4$), which begins forming when the battery is filled with sulfuric acid. In a battery, in good condition, the anode electrode or plate, namely, the positive electrode, corrodes slowly.

Investigation of condemned batteries, usually batteries which are two to four years old, shows that one to two percent of the total plate lead mass, excluding interconnecting lead bars and terminals, has deteriorated. This forms a deposit, consisting mostly of lead dioxide ($PbO_2$) on the bottom of the battery case.

BATTERY DETERIORATION

A primary reason for the weakening of the battery is that crystallized lead sulfate, $PbSO_4$, is formed in the porous insulators which are also known as separators that are spaced between the anode plates and the cathode plates. This crystallization occurs continuously and is accelerated if the battery is at low charge. When the crystals invade, they clog the porosity of the insulators. This deactivates an increasing area of the lead plate surface. Consequently, from the time the battery is initially filled with sulfuric acid, the charge and size of the battery shrinks.

Because the crystals grow under the influence of an electro-magnetic field, the crystallization is polarized. Lead sulfite crystals thus grow in one direction. Lead sulfate is not a conductor in its amphoteric state, but becomes a good conductor in its crystalline state. The final death of the battery happens when the crystals grow through an insulator and conduct between the anode and the cathode in one or more cells. The cell then self-discharges at a continuous and increasingly rapid rate. The battery is then declared useless, disposed of and replaced with a new one.

A PREVAILING SAFETY THREAT

Disposal of batteries is a growing problem. A condemned battery is usually only of value if it is recycled as a secondary lead source. This depends on fluctuating prices, and the battery weight, since batteries are heavy to transport to a recycling facility. Since lead is a serious contaminant, the current practice of storing hundreds of millions of condemned batteries poses an environmental threat. The lead from a single condemned battery is sufficiently lethal to kill thousands of living beings—animal or human.

STORING ENERGY

A problem with electricity is storage. A commonly used mass energy storage consists of pumping stations for lifting water into elevated dams before it can be released to generate power. Solar cells and windmills generating electricity are often impractical, since they are weather dependent for generating power. Energy from such alternative energy sources are not easily stored, due to the short lifetime of a lead-acid battery.

To avoid black-outs, such as those that happened during the late sixties in the north eastern United States and Canada, utility companies currently run "spinning reserves" which are constantly phased in, at great expense. Duplicating and even triplicating transmission lines are needed to ensure steady electrical flow. Lead-acid batteries could handle the storage, but are insufficient because of their short life expectancy.

An answer to the environmental threat of smog is electrically powered automobiles. These vehicles are not yet in common use, because their batteries deteriorate quickly, must be disposed of, and their replacement is expensive.

This invention seeks to change fields of industry which need electrical energy storage, by providing an enhanced electrical energy source through secondary batteries. The invention is further directed to avoiding many environmental hazards.

SUMMARY

The invention seeks to overcome the disadvantages related to secondary batteries, and to provide an enhanced form of electrical power source.

According to the invention, there is provided a method of charging and recharging secondary batteries. In a lead-acid battery destructive lead sulfate crystals are dissolved by a reverse charge. The electromagnetic field is reversed 180 degrees, and the crystals are dissolved. It is believed that the dissolved material is amphoteric lead sulfate and lead sulfite.

A first aspect of the invention relates to Reverse Polarity Recharge ("RPR"). A first step in RPR is to discharge the battery as much as possible. A 12 volt battery, for example, should be discharged to about 0.5 volt. This can be done by an external load or by charging another battery at a lower voltage. This charging or recharging of the battery is then done in reverse by switching polarities. The term "charging" or "recharging" is used herein interchangeably and synonymously. The anode of the battery being charged becomes the cathode. The cathode of the battery being charged becomes the anode. The positive pole is connected to the negative conductor and the negative pole to the positive conductor.

The partially corroded original anode is protected by lead sulfite and lead sulfate and stops corroding. The original cathode, which is intact, becomes the new anode at substantially full surface capacity. The lead sulfate crystals rapidly dissolve and the porosity of the insulators is restored. "Dead" cells, where conducting lead sulfate crystals have short circuited cells, can be rehabilitated. Cells are substantially revived and take on their original capacity for electrical energy storage.

The RPR process is accelerated by exercising the battery, by providing alternating several strong charges and discharges. Although it works on dead batteries, RPR should, optimally, be applied periodically before the battery develops severe lead sulfate crystallization and dies. A lead-acid battery can be subjected to RPR multiple times, thereby keeping it at substantially maximum capacity.

A second aspect of the invented process acts to destroy growing lead sulfate crystals continuously. This method relates to Reverse Pulse Charge ("RPC").

The RPC process involves applying repeatedly a reverse polarity short pulse, thereby destroying build-up of lead sulfate crystals. RPC constantly protects the battery from deterioration.

Periodic RPR may be needed. The two processes, RPR and RPC can be used together or sequentially for optimum performance and longevity.

More specifically according to the invention there is provided a method of treating a secondary battery. The battery includes a casing containing, for operation in a first operational mode, a first anode of a first anode material for operation in a first anode mode, and a first cathode of a first cathode material for operation in a first cathode mode.

In the casing there is an insulator or separator between the first cathode and the first anode, an electrolyte, a first cathode terminal from the first cathode, and a first anode terminal from the first anode. The terminals are for normally connecting a load to the battery in the first mode.

The invented treatment method comprises the steps of applying, for a predetermined time, a charging or recharging current to the respective terminals. A voltage for applying the charging current is directed so that a positive terminal of a charging input is applied to the first cathode terminal. A negative terminal of the charging input is applied to the first anode terminal.

The first cathode terminal is established as a second anode terminal and the first anode terminal as a second cathode terminal for operation of the battery on a load in a second operational mode.

After an operating cycle in the second mode, charging or recharging is effected by applying, for a predetermined time, a charging or recharging current to the respective terminals. A voltage for applying the charging current is directed so that the positive terminal of the charging input is applied to the second cathode terminal, and the negative terminal of the charging input is applied to the second anode terminal. The second cathode terminal is established as a third anode terminal and the second anode terminal as a third cathode terminal whereby the battery is again operable in the first mode.

Repetitively charging or recharging of the battery after its operational mode is effected by connecting the positive terminal of the charging input to the terminal which immediately previously acted as an effective cathode terminal and the negative terminal of the charging input to the terminal which immediately previously acted as an effective anode terminal.

When a discharge of the battery is effected in the operational mode through a load connected between the first anode terminal and the first cathode terminal, the electrolyte effects an electrochemical change at least on one of the anode, cathode or the insulator. An electrolytic contaminant solid is deposited within the battery. The application of the charging or recharging current, at least in part, dissolves or removes the contaminant product.

When the first anode material is lead covered with lead dioxide, if charged, the first cathode material is lead or lead alloy covered with lead sulfate, if discharged, the electrolyte is sulfuric acid. In that situation the contaminant, as a result of battery operation includes lead sulfate crystals.

The insulator or separator includes a material having a defined porosity, and applying the charging or recharging treatment increases the porosity of the insulator.

After operation in the first mode with the first anode terminal and the first cathode terminal defined as indicated, a switch is effected whereby these terminals are respectively defined to be the cathode terminal and the anode terminal respectively for the second operational mode.

Charging or recharging is effected such that the first cathode terminal is connected for charging to the positive terminal of the charging or recharging input and the first anode terminal is connected to the negative terminal of the charging or recharging input. The definition of the respective terminals, after a predetermined time of operating in respective modes is periodically reversed. The third, fifth and subsequent "odd" numbered operating modes are the same as the "first" operating mode. The fourth, sixth and subsequent "even" numbered operating modes are the same as the "second" operating mode.

The invention is directed to the method of treating a battery, the battery so treated, and the method and means for effecting the battery treatment, namely charging and recharging the battery regularly, periodically or as needed.

The invention is further described with reference to the accompanying drawings.

DESCRIPTION

The battery includes a casing containing, for operation in a first operational mode, a first anode 11 of a first anode material for operation in a first anode mode. The first anode 11 includes a series of plates which are spaced apart and connected with a strap 12. There is a first cathode 13 of a first cathode material for operation in a first cathode mode. A strap 14 connects the spaced apart plates 13.

There is an insulator or separator 15 between each of the plates of the first cathode 13 and the plates of the first anode 11. A first cathode terminal 16 extends above the top of the casing 10 from the first cathode 13, and a first anode terminal 17 extends above the casing 10 from the first anode 11. The terminals 16 and 17 are for normally connecting a load to the battery in the first mode. An electrolyte 18 in the form of sulfuric acid fills the casing 10 so that the plates of the anode 11 and cathode 13 are covered with the liquid electrolyte.

Figure 6:
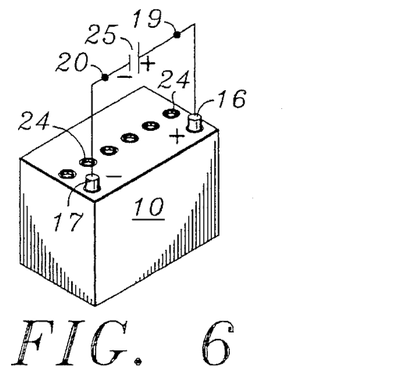
FIG. 6 illustrates charging or recharging of the battery and the lead dioxide burn-off on the cathode.

The invented treatment comprises the steps of applying, for a predetermined time, a charging or recharging current to the respective terminals 16 and 17. A voltage for applying the charging or recharging current is directed so that a positive terminal 19 of a charging input is applied to the first cathode terminal 16. A negative terminal 20 of the charging input is applied to the first anode terminal 17. This is illustrated in FIG. 6.

The first cathode terminal 16 is established as a second anode terminal and the first anode terminal 17 is established as a second cathode terminal for operation of the battery on a load in a second operational mode.

After an operating cycle in the second mode, charging or recharging is effected by applying, for a predetermined time, a charging or recharging current to the respective terminals 16 and 17. A voltage for applying the charging or recharging current is directed so that the positive terminal 19 of the charging or recharging input is applied to the second cathode terminal 17. The negative terminal 20 of the charging input is applied to the second anode terminal 16. The second cathode terminal 17 is established as a third anode terminal and the second anode terminal 16 as a third cathode terminal. Effectively the battery is again operable in the first mode.

Repetitively charging or recharging the battery, after substantial completeness of its life in its designated operational mode, is effected by connecting the positive terminal 19 of the charging input to the terminal which immediately previously acted as an effective cathode terminal. The negative terminal 20 of the charging input is applied to the anode terminal which immediately previously acted as an effective anode terminal.

When a discharge of the battery is effected in the operational mode through a load connected between the first anode terminal and the first cathode terminal, the electrolyte 18 effects an electrochemical change at least on one of the plates of the anode, cathode 13 or the insulator 15. An electrolytic contaminant solid in crystal form is deposited within the battery. The application of the charging or recharging current in the reverse mode as described, at least in part, dissolves or removes the contaminant crystalline product.

The first anode material is lead covered by lead dioxide during charging, and the first cathode material is lead covered by lead sulfate. The electrolyte is sulfuric acid and the contaminant, as a result of battery operation, is lead sulfate crystals.

The insulator 15 includes a planar material having a defined porosity which is blocked by the contaminant materials. Applying the charging or recharging current increases the porosity of the material and removes the contaminant.

The first anode terminal and the first cathode terminal 16 are defined after charging or recharging to be the cathode terminal and the anode terminal respectively. The definition of the respective terminals, after a predetermined time of operating in a respective mode is periodically reversed.

The figures illustrate a 12-volt lead-acid battery. The invention can have applications for any particular voltage battery.

The implementation of RPR requires a voltage meter and a battery charger. A battery does not have to be moved to do RPR. Substantially, no energy is wasted, even during the discharge. The battery is restored to substantially full capacity.

Figure 1:
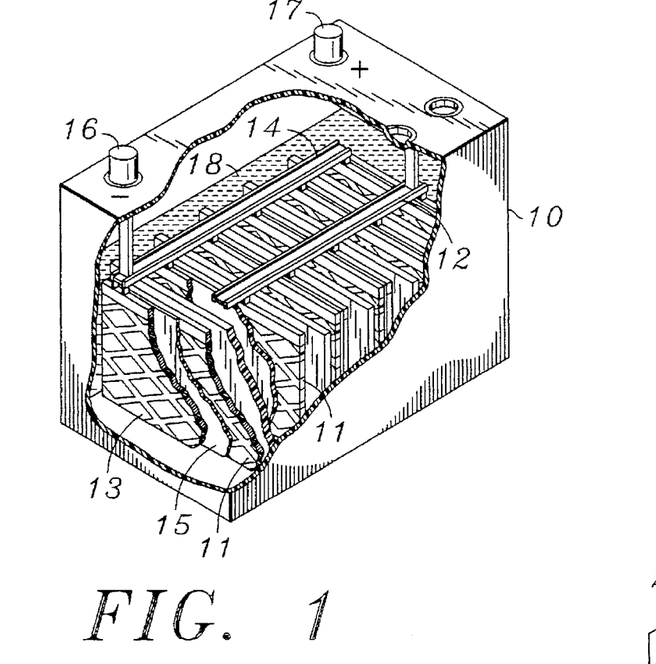
FIG. 1 is a perspective view, partly fragmented, illustrating a secondary battery, namely a lead-acid battery, and showing polarity markings.

In FIG. 1, there is shown a 12-volt battery with the original manufacturer's polarity. There is a plus pole, namely the anode terminal 17, and a minus pole, namely the cathode, terminal 16. There are marking collars which are usually red and green or black as shown.

Figure 2:
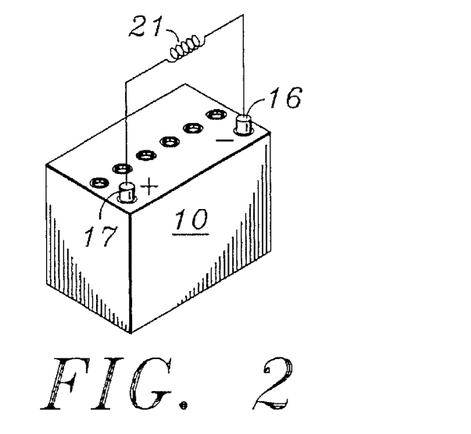
FIG. 2 illustrates the battery being discharged using an external load.
Figure 3:
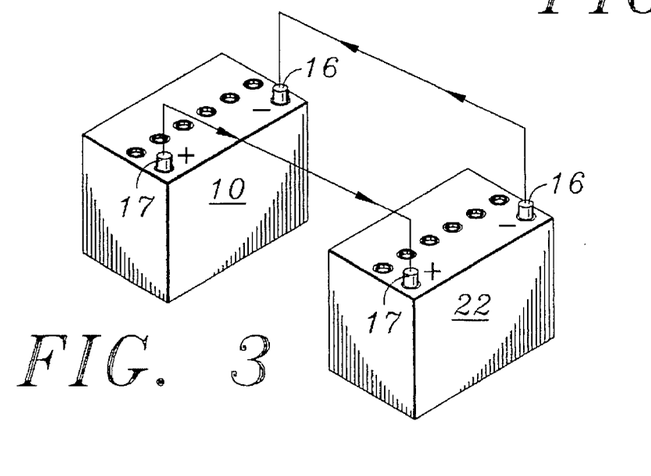
FIG. 3 illustrates the discharge of the battery and the saving of the discharged stored energy.
Figure 4:
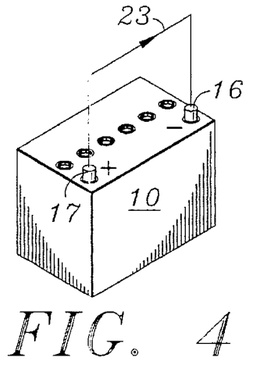
FIG. 4 illustrates a final discharge.

The battery can be discharged one of two ways. FIG. 2 shows the discharge by an external load 21. FIG. 3 shows the discharge into a lower voltage reservoir battery 22, for instance at 10 volts. FIG. 4 illustrates a final discharge by shorting the positive to negative terminals 17 and 16, respectively, of the battery with line 23.

Figure 5:
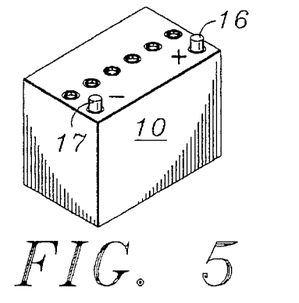
FIG. 5 illustrates the preparation of the battery for RPR and the re-identification of the anode and cathode terminals.

In FIG. 5, the battery is illustrated being prepared for RPR. The terminals 17 and 16 are reverse marked to define the different anode and cathode for the second mode of operation. The black or green becomes red, namely the positive terminal 16. The red terminal 17 becomes the black or green, namely the negative terminal.

Figure 7:
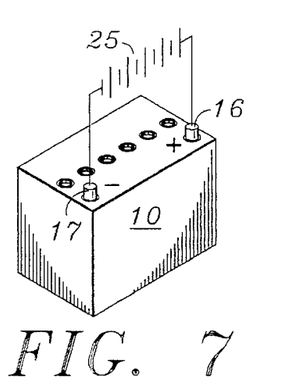
FIG. 7 illustrates charging or recharging the battery at normal rate.
Figure 8:
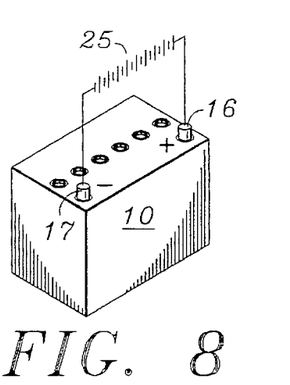
FIG. 8 illustrates an accelerated charge or recharge of the battery.

As illustrated in FIG. 6, an initial low voltage charge is applied as the lead dioxide burns off on the second cathode 11, namely the first anode. The vents 24 of the battery should be opened. The charger or recharger 25 applies a voltage of about 2–6 volts. In the arrangement in FIG. 7 shows normal charging with 14 volts. Lead dioxide builds up on the second anode FIG. 8 shows the next step of the process, namely the application of a boost charging of 200A. This causes an acceleration of the lead dioxide buildup on the second anode 13, namely the first cathode 13. The charger 25 is at 20 volts.

Figure 9:
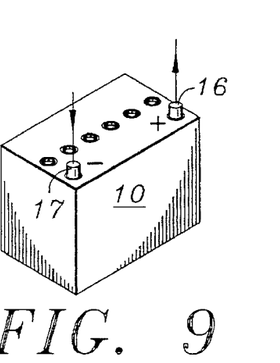
FIG. 9 illustrates exercising the battery by discharging.
Figure 10:
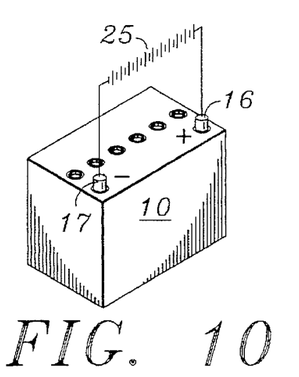
FIG. 10 illustrates exercising the battery by charging or recharging.

FIGS. 9 and 10 illustrate the exercising of the battery. The discharge and charging at 200 amps to 500 amps is effected which dissolves lead sulfate crystals.

Figures 11A, 11B:
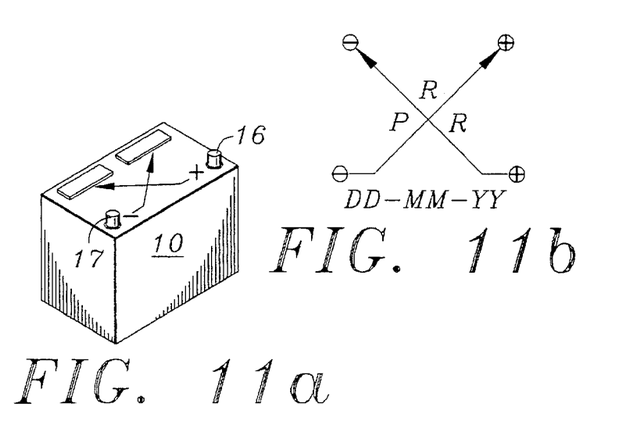
FIGS. 11a and 11b illustrate the final charged or recharged battery with a RPR marking.

FIGS. 11a and 11b illustrate the battery after completion of RPR with a close-up view of the RPR marking and date stamped.

Figure 12A:
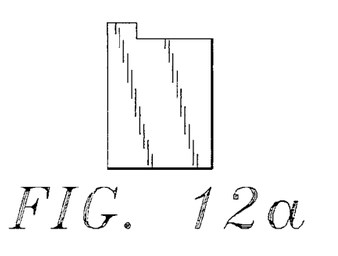
FIGS. 12a, 12b and 12c illustrate the internal battery components after, typically, long use, and before RPR.
Figures 12B, 12C:
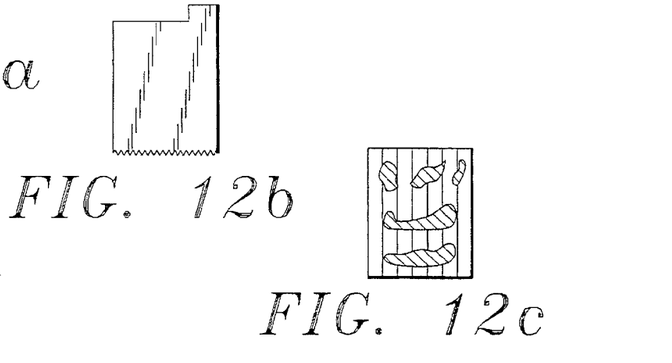

FIGS. 12a, b and c show the battery components before RPR. The battery has only 25% capacity. The characteristics shown are as follows. In FIG. 12a there is a Cathode (−) plate after long use. The plate is still intact. In FIG. 12b there is an Anode (+) plate after long use. It is 1%–2% deteriorated. In FIG. 12c there is a separator with clogged porosity due to $PbSO_4$ crystal buildup.

Figures 13A, 13B:
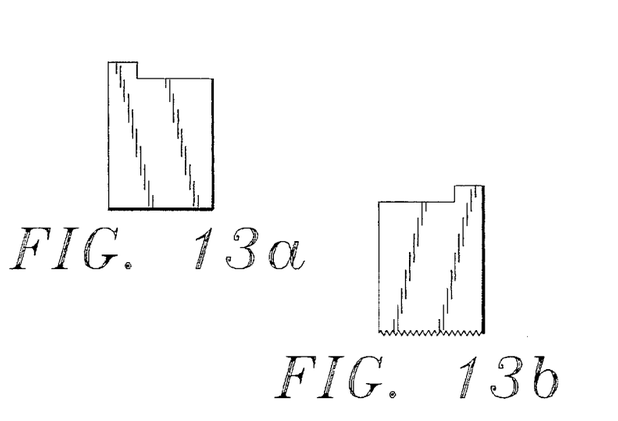
FIGS. 13a, 13b and 13c illustrate the internal battery components after RPR. This should be compared in relation to FIGS. 12a, b, and c.
Figure 13C:
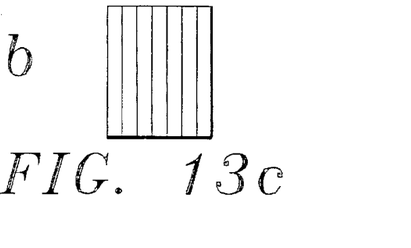

FIGS. 13a, b and c show the battery components after RPR. The battery has near 100% capacity. The characteristics shown are as follows. In FIG. 13a there is an Anode (+), which after RPR is intact. In FIG. 13b there is a Cathode (−), which after RPR is 1% deteriorated. Deterioration is halted, and this has no effect on capacity. In FIG. 12c there is shown a separator which after RPR is unclogged. $PbSO_4$ crystals have dissolved.

Figure 14:
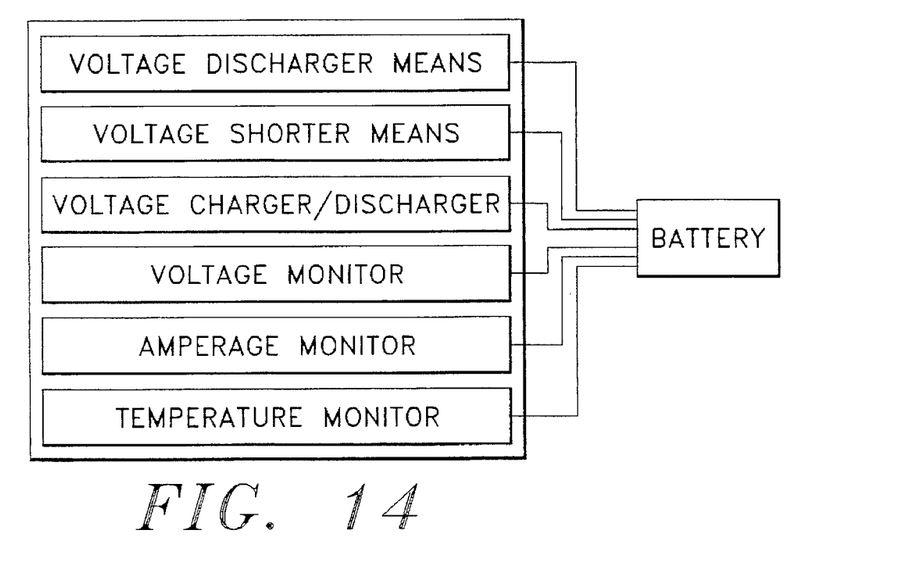
FIG. 14 shows a typical charger system for the invention.
Figure 15:
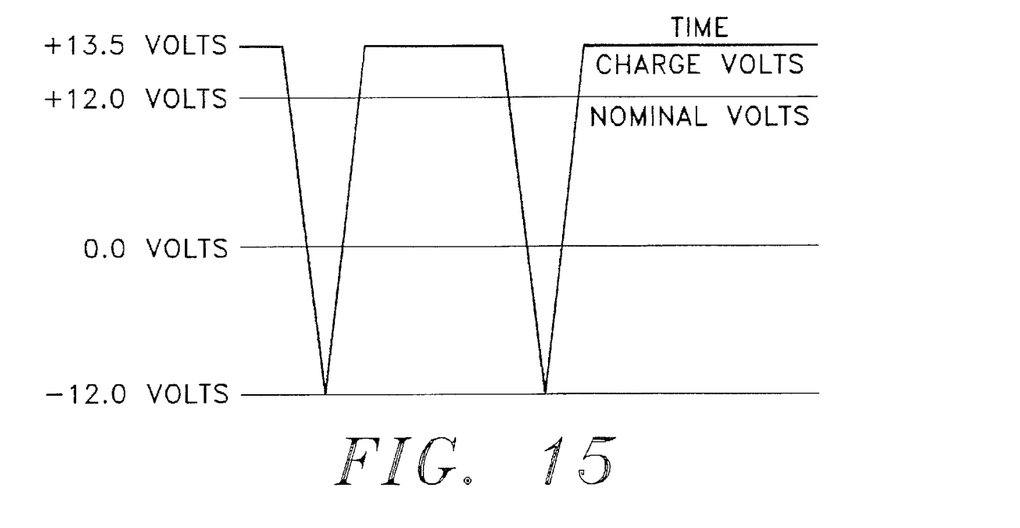
FIG. 15 illustrates graphically the principles of RPC, showing the periodic pulsing of a battery.

FIG. 14 illustrates RPC in a graphical format and shows that application of different voltage levels between −12 volts, 0 volts, +12 volts, +13.5 volts applied for different time periods. Pulses of charging or recharging at different voltages destroy the lead sulfate crystals.

BATTERY MAINTENANCE

RPR and RPC is used to rehabilitate condemned lead-acid batteries and to prevent usable lead-acid batteries from becoming condemned and scrapped. For the sake of illustration, the process of RPR is described to rejuvenate a weak or useless lead-acid battery.

There are two ways to eventually destroy a lead-acid battery.

1. Continued use of the battery until it collapses.
2. Discontinued use for a lengthy time, usually from three months to several years.

BATTERY DESTRUCTION BY CONTINUAL USE

When a battery is continuously used the build-up of lead sulfate crystals in the porous insulators reduces the active surfaces of the insulators 15 and the anode and the cathode plates. Approximately 50% of the surface of the insulators 15 become clogged after 12 months of usage. Within the next 12 months, the area is halved again; usually the insulators 15 are 25% usable. After four years, the storage capacity of the battery is only about 12.5% of the original storage capacity and the cranking power specified by the battery manufacturer.

Sulfuric acid which is the electrolyte converts to water after combining with lead into lead sulfate which is the base material of the electrodes. A weaker sulfuric acid cannot dissolve the contaminant lead sulfate crystals which, thus grow faster and make the battery grow weaker.

Prior art methods of charging or recharging involve replacing the weak sulfuric acid solution with a stronger sulfuric acid electrolyte solution, discharging the battery, and then recharging it. It is of minimum benefit as the lead sulfate crystals do not dissolve and the insulators remain clogged.

For a 12-volt battery, the constant charging voltage is 13.5–13.7 volts, even when the battery is "fully charged". This means that large amounts of lead dioxide have built up on the anode. This large amount of lead dioxide becomes, however, increasingly deactivated. Less of the anode can participate in the discharge process as the insulator clogging prevents the reduction lead dioxide reduction to lead and oxygen. Examination of such a battery shows heavily clogged insulators 15, with little or no porosity left. There is a relatively strong sulfuric acid in the solution. The contaminant material of the pores are lead sulfate crystals $PbSO_4$ and lead dioxide.

Battery cells that have grown $PbSO_4$ crystals which conduct between the anode to the cathode plates, have a weak sulfuric acid solution since these cells are continuously discharging. The voltage of such a 12 volt battery remains at 10 volts when one cell is shorted, irrespective of attempts to restore the battery to 12 volts.

RPR ON A CONDEMNED "USED UP" BATTERY

The first step of RPR is to discharge the battery by an external load and by short circuiting for enough time to reduce the battery voltage to below 1 volt. There are still large amounts of $PbO_2$ in an inactive state left on the anodes. Using reverse polarity, the recharge or charge is affected. Typically, 2-4-6 volts is progressively to be applied through the battery charger 25. This converts the remaining $PbO_2$ on the second cathode (the first anode) to Pb and $H_2O$.

A strong energy in the form of eddy currents and chemical reduction results. The lead-acid battery becomes warm to hot, and the sulfuric acid solution becomes weaker. During this phase of the $PbO_2$ burn-off from the second cathode, the battery temperature is closely monitored in order not to permanently destroy the insulators 15 and battery casing 10. In the case of overheating, stopping the charge from charger 15 might not stop the $PbO_2$ burn-off process. The process can continue without any external current, and even more heat is generated. This runaway "melt down" condition can be stopped by applying a strong discharge through the charger 25. The internally generated electricity then has a way to discharge externally. With a proper power charge, this "melt-down" condition can be avoided.

Once the $PbO_2$ has burned off the second cathode, the charge or recharge step is started. The charging voltage can be increased rapidly to 14–15 volts or more, as long as the battery does not overheat. The viscosity of the sulfuric acid solution rapidly increases and the battery actually cools down. The $PbSO_4$ crystals dissolve, forming new $PbO_2$ buildup on the newly created second anode plates 13, namely the first cathode plates 13. When it is fully charged, the second anodes 13 are covered by $PbO_2$. The battery is then additionally exercised to dissolve remaining $PbSO_4$ crystals which are clogging the pores of the insulators 15. The exercising also breaks up shorting $PbSO_4$ between a respective anode and cathode.

RPR ON A BATTERY CONDEMNED THROUGH DISUSE

In a condemned battery, namely one that has gone unused for a long time, the $PbO_2$ on the anode 11 has dissolved. A heavy crystallization of $PbSO_4$ develop everywhere in the cells. Little or no voltage is present. The crystals can be observed as a white coating of $PbSO_4$ which covers the plates 11, 13 and insulators 15. A traditional charge attempt is useless, as the battery will not accept a charge. The clogged insulators 15 and the overall coating of $PbSO_4$ prevents current from passing through the battery.

RPR can be conducted on this battery using the reverse polarity of the charging step of the invention as described without prior discharge. In order to start a current flow, the voltage of the charger 25 is significantly increased, namely up to 20–24 volts for a 12-volt battery. Within a short time, namely minutes, a current starts to flow, and initial openings of the clogged insulators 15 occurs. These reopenings grow rapidly in size and number. A voltage reduction from the charger 25 is effected in order not to overheat the charger 25. A normal charging voltage can then be applied, until the battery is fully charged. The surfaces of the second anode plates 13 are then covered with $PbO_2$. The battery is then exercised to further dissolve $PbSO_4$ crystals.

EXERCISING THE BATTERY

Exercising a lead-acid battery after RPR might be unnecessary. This depends on the battery usage. When the battery is used in an environment, such as a car, where the battery is constantly subject to an alternating strong discharge, followed by a strong charge, exercising is automatic. After charging or recharging in accordance with the invention namely with the reversed electrodes, a few hours of driving the car can dissolve remaining $PbSO_4$ crystals. The battery becomes stronger through time until it reaches a substantially top condition, similar to the original manufacturers specification.

Should the battery not be automatically exercised by pumping or applying a strong discharge, followed by a strong charge, a follow-up process is effected.

Discharge of the battery is effected very quickly, and five to ten times the specified amperage capacity for the battery is applied. For instance, a 60 ampere-hour (AH) battery can be discharged of 300 amps. This is followed by a similar charge, as long as the temperature of the battery is not too excessive. This exercise is repeated with increased amperage until the $PbSO_4$ crystals are dissolved. This can be verified in the following manner: When a 60 AH battery accepts a charge or discharges in six minutes with a current of 600 amps, the battery is effectively restored.

RPR ON A "GOOD" BATTERY

A battery which is new, or completely restored by RPR can be subject to RPR within minutes, as there are no obstructing $PbSO_4$ crystals blocking the flow of electricity. A maximum discharge amperage can be immediately followed by a maximum amperage charge to the limit of mechanically damaging the battery by strong electro magnetic forces or by overheating. The process of RPR can be repeated a seemingly unlimited number of times and should optimally be used as maintenance, before the battery goes bad and is destroyed.

RPC FOR BATTERY MAINTENANCE

The second concept of the invention relates to repeatedly reversing the polarity. This is the concept of Reverse Pulse Charge (RPC). A lead-acid battery which is constantly charged in one direction builds $PbSO_4$ crystals clogging the porosity of the insulator 15. As the RPR can be repeated many times, the avoidance of $PbSO_4$ crystal build can be achieved by constantly and repeatedly applying short jolts of RPR, named RPC.

During the charge under RPC, this reverse pulse (for example: 1–10 milliseconds) flows opposite the polarity of the battery. Being short in duration, does not affect the normal environment in which the battery is used. The reverse pulse is at a voltage strongly opposite the normal voltage of the battery. A 12-volt battery should be reverse pulsed at about 24 volts, so that a short reverse current inside the battery occurs. This pulse dissolves $PbSO_4$ crystals which are currently building.

The application of RPC continuously keeps the porosity of the insulators 15 intact. After long usage, however, contamination of $PbO_2$ and/or $PbSO_4$, as well as PbS, on the lead plates might necessitate a periodic full RPR. This would keep the battery in original charge/discharge condition.

AVOIDING OVERLOADING AND CARBONIZATION OF INSULATORS

Another aspect of irreparably destroyed batteries is an overload due to clogged insulators 15. When a single cell, usually closest to the positive (+) pole, namely the anode is heavily clogged, with other cells less clogged, a strong charge/discharge might overload the most clogged cells and/or the insulators 15 between the electrodes 11 and 13. This results in an overheating by ohm resistance at unclogged points in the battery where current can still flow. The plastic insulator 15 temporarily melts. The porosity of the insulator 15 is lost at these points.

By RPR, other clogged surfaces of the insulator 15 are opened and the battery restored to near original capacity. Where, however, the overload/overheat of the insulator results in spot carbonizing of the insulator 15, the cell becomes shorted due to the conductivity of the carbon. This condition of spot overheating of the insulators 15 can be avoided by regular RPR.

MONITORING THE NEED FOR RPR

Monitoring to determine the necessity of conducting an RPR is relatively easy. An electronic device or microcomputer monitors the condition of a lead-acid battery, by checking the acceptance of charge (amperage) in comparison to applied voltage and/or the discharge current (amperage) in comparison to the load (OHM). The monitoring devices give an early warning as to when it is due to conduct RPR to thereby extend the life expectancy of the battery.

At 20% loss of capacity, for instance, a RPR is recommended. In a sophisticated environment RPR can be fully automated. This can be in electrical vehicles, submarines, aircraft batteries, power utility buffer batteries, or solar cell installations.

LENGTH OF THE RPR PROCESS

The time it takes to conduct RPR is dependent on the following factors:

a) The capacity of the discharging/charging equipment.
b) The amount of $PbSO_4$ clogging the porosity of the insulators.
c) The amount of inactive $PbO_2$ accumulated on the anodes.
d) The maximum temperature the battery can withstand without permanent damage. Cooling devices such as air cooling, liquid cooling, forced circulation of battery solution can be used as appropriate.

When the battery is in a non-deteriorated state, with little $PbSO_4$ clogging, with no residual, inactive $PbO_2$ charge, and with proper cooling, a rapid RPR can be applied.

For example, a 60 AH with 10 AH residual charge can be discharged at a rate of 500 amps in approximately one minute, followed by a reverse charge and depending on the capacity of the charger used. The time of effecting an RPR versus a normal prior art charge technique, (non RPR) should not be greater than 10%, when the battery is in the above condition.

EXAMPLES

RPR has been conducted on completely condemned lead-acid batteries. Such batteries include 500 amp cordless telephone batteries, 12 amp motorcycle batteries up to 400 AH stationary batteries, and aircraft batteries. These batteries have been successfully restored to substantially full power. However, "non-restorable" conditions, such as burned off internal conduits, disconnected plates or carbonized insulators have existed in some cases.

Two 200 AH stationary batteries connected in series to provide a 24-volt supply. The batteries were condemned by disuse, but were rehabilitated by RPR. The interconnections between cells were open. Voltage level intervals 0-2-4 etc. up to 24 volts were accessible. The stationary batteries were placed under constant charge by a 24 volt - 8 A charger.

When a test of a condemned 12-volt battery for RPR was to be conducted, the battery was discharged, if necessary, into the stationary reservoir battery by connecting the battery to a battery at 2-volt lower position relative to the latter battery. Thus energy was not wasted.

If the test battery was holding 10 volts (one dead cell) it was discharged into four cells (8 volts) into the reservoir battery. Within minutes the test battery discharged to 8 volts. The discharge was moved to 3 cells (6 volts) of the battery. This continued until no more discharge at 2 volts was achieved. The test battery was then completely shorted for final discharge.

The connections to the reservoir battery were then reversed. The plus terminal was connected to the negative terminal, and the negative terminal to the plus terminal. RPR was started. Initially, a 2-volt charge from the charger 25 was applied to determine the reaction of the test battery. Normally, the test battery reacted violently to a strong charge and the initial burn-off of the $PbO_2$. Within minutes the charge was increased to 4 volts, then 6 volts, etc., monitoring any temperature increase in the test battery. Within approximately 10 minutes, the test battery accepted a 14-volt charge without overheating. The battery was then left at 14 volts for a few hours until the battery was fully charged.

Next, it was exercised to destroy $PbSO_4$ crystals: The 12-volt charge of the test battery was again dumped back to the reservoir battery at intervals of 10 volt-8 volt-6 volt-4 volt-2 volt, at a very rapid rate. The battery was then charged again by applying 14 volts directly.

Exercising was unnecessary when installing the test battery directly into a car. It was automatically exercised by the strong discharges and charges normally occurring when driving a car.

With other batteries, exercising was done repeatedly, with ever increasing amperage. The test cell bubbled like a newly-opened soft drink. This is due to created gases: $H_2$ gas during the charge, $O_2$ gas during the discharge.

The temperature of the test battery is actually lowered. More of the electrical energy is converted to chemically stored energy. Less of the energy is converted to heat as the internal resistance decreases. The porosity of its insulators 15 increases.

The test battery was then compared to an identical, brand new battery. The test battery was installed in a car. Although the engine remained off, all electrical loads were turned on; namely headlights, radio, air conditioner, etc. The time for discharge was measured at a threshold value of 10 volts. The same was done to the brand new battery of an identical type. Little time difference, if any, was observed. In the same way, the discharge (cranking power) was matched against the new battery. The performance of the test battery substantially equaled the new battery.

To measure the longevity of a previously condemned battery, it was retained in a car, and driven daily for some time period. No degradation of its performance was noticed.

To compare the state of the insulators in the test battery, before and after RPR, a condemned 40 AH battery with outside open cell inter-connectors was selected. Three cells before RPR were removed. The remaining three cells were applied as for a six volt battery. The insulators were compared before and after RPR. Almost all $PbSO_4$ contamination, including the buildup of $PbO_2$, had dissolved on the insulators. All plates from the connecting bars were removed, the plates were rinsed from loose deposit into the bottom residue which had collected as the bottom fallout, as mostly $PbO_2$. The bottom deposit was dried and weighed against the plates and found out that only about 1–2% of the total lead mass of the plates had deteriorated into bottom deposits. The life expectancy of a battery treated according to the invention could be extrapolated to be about 25 years.

COLORS OF COMPOUNDS VISIBLE ON INSULATORS

| Compound: | | Color: |
|---|---|---|
| lead | Pb | gray |
| lead sulfite | PbS | black |
| lead sulfate | $PbSO_4$ | white |
| lead dioxide | $PbO_2$ | brown |
| lead oxide | PbO | yellow |
| sulfuric acid | $H_2SO_4$ | clear |

NICKEL-CADMIUM BATTERIES

A new Ni-Cd battery usually puts out 1.3–1.4 volts. Once deteriorated below 1.1 volts, the cell is considered useless. In such a battery, the anode is a nickel alloy material and the cathode is a cadmium material.

Traditionally, in terms of prior art techniques, a Ni-Cd battery is rejuvenated by "deep cycling". This involves the following steps:

a. Discharge the battery with a load.
b. Complete the discharge with direct shorting.
c. Recharge in the most effective manner.

The process is rather time-consuming (3–12 hours), as the final battery charge (step b) discharges very slowly. This traditional method will eventually prolong the life expectancy of the battery, but an ongoing weakening is unavoidable. A Ni-Cd battery can become shorted, refusing all discharges or charges, and must then be disposed of in a safe manner. The definition of safe disposal is questionable, since the cadmium content is extremely poisonous and thus environmentally hazardous. A sealed Ni-Cd battery explodes if disposed of by incineration.

A Ni-Cd battery has the mysterious characteristic of "memory"; the battery remembers the previous discharge and will not discharge below it. Traditional "deep cycling" partially resolves this problem, but must sometimes be repeated several times in order to 'erase' the battery's memory.

REVIVAL BY RPRF

Applying a forced reverse charge, instead of only a complete discharge (deep cycle), should be advantageous to revitalizing its condition.

By its nature, a Ni-Cd battery normally cannot be recharged in a reverse polarity manner, RPR. However, similar reactions to the lead-acid batteries can be experienced with the nickel-cadmium battery. A reverse charge can be temporarily applied in order to refresh a "tired" Ni-Cd battery. This method is termed Reverse Polarity Refresh, namely RPRF.

Applying RPRF resolves the above-described problems, by following this procedure:

1. Discharge the Ni-Cd battery (as in step 'a' of the traditional 'deep cycling').
2. Instead of the time-consuming total discharge by shorting the battery, apply a reverse current (positive volt on the negative pole and vice versa) with a voltage of up to (but not limited to) the nominal voltage of the battery.
   The battery will, after only a short time, namely within minutes, actually hold a reverse charge up to the nominal voltage of the battery.
3. Once it holds a reverse charge, apply a normal discharge. This charge can be done rapidly, since the battery is now reconditioned and the memory has been erased.

Individual cell voltage is now restored to 1.3–1.4 volts and the Ni-Cd battery's performance is similar to that of a new battery.

RPRF takes a fraction of the time of the prior art "deep cycling" method, does not need to be repeated and removes the Ni-Cd battery's "memory".

If one or more cells of an Ni-Cd battery has become shorted, the individual cells should be 'reversed shocked' by, for example, a jolt of 2.0–3.0 volts. This brings the shorted condition to cessation and the battery can now be subjected to a complete RPRF.

Tests using RPRF on Ni-Cd batteries have been successful on sealed type batteries. This invention should also operate with ventilated Ni-Cd batteries.

RPR CHARGER/RECHARGER FOR LEAD ACID BATTERIES

A charger/recharger of the invention manually/automatically performs the following steps:

1. Checks voltage. If below a preset threshold value, proceeds to step 2. Discharges the battery using external load until threshold value is reached.

2. Shorts the battery. Monitors amperage. If below preset threshold value, proceeds to step 3. Keeps shorted until amperage goes below present threshold.

3. Reverses polarity connections manually/automatically. This step can be conducted anytime before or after steps 1–2.

4. Starts charging/recharging using low voltage. Monitors amperage. If above preset value, lowers voltage. If below preset value, increases voltage. Continues until fully charged.

5. Optional. Exercises the battery by strong discharges and strong charges. Repeats process until the battery reaches a predetermined performance value by monitoring amperage during charges/discharges and time for the charges/discharges.

6. Optional. Repeats steps 1–4 or 1–5. The battery will now be charged with original polarity.

7. Optional. Repeats steps 1–6 any number of times.

The sensor should be coupled to the battery and contain a mechanical or electronic relay using the battery power to engage. Depending on the polarity, the solenoid actuates in opposite directions, thereby connecting the batteries to the desired polarity of the load.

This device makes a physical transfer of battery connections unnecessary after RPR, and automatically protects the load from incorrect polarity.

NI-CD CHARGER/RECHARGER FOR RPRF FOR NICKEL-CADMIUM BATTERIES AUTOMATIC POLARITY SENSOR AND SELECTOR

A charger/discharger of the invention manually/automatically performs the following steps:

1. Checks voltage. If below a preset threshold value, proceeds to step 2. Discharges the battery using external load until threshold value is reached.

2. Shorts the battery. Monitors amperage. If below preset threshold value, proceeds to step 3. Keep shorted until amperage goes below present threshold.

3. Reverses polarity connections manually/automatically. This step can be conducted anytime before or after steps 1–2.

4. Start charging using low voltage. Monitors amperage. If above preset value, lowers voltage. If below preset value, increases voltage. Continues until the nominal voltage is held steady in reverse charged mode.

If battery assembly contains shorted cells, detectable since nominal voltage cannot be reached: Applies a strong reverse voltage on the shorted cell until the cell holds nominal voltage in reverse. This can also be used, as a prelude to step 4, on all cells.

5. Optional. Discharging by shorting momentarily.

6. Re-reverse polarity. Charges the battery with original polarity.

EXEMPLARY APPLICATIONS OF THE INVENTION ELECTRICAL ENERGY STORAGE

Power utility and power distributors suppliers have to ensure uninterrupted electrical power to consumers. A single inadvertent contingency needs to be instantly overcome. Double contingencies must be kept to minimal inconvenience, or loss of service, to the consumer. Accordingly, enormous efforts and monies are spent to meet this demand.

A solution would be to store electricity in a reliable lead-acid battery a short distance from the consumer. The following exemplary computation shows the practicality with the present invention.

Assume the average electrical consumer uses 5 kwh per 24 hours, which is the national average. Each consumer would require a 500 AH battery at 12 volts, namely, a 2-volt margin for conversion to AC and losses, to buffer a 24-=hour non-interruptive supply of electricity. Peak loads can also be buffered by the battery, and unreliable power from solar cells can be stored.

A 500 AH buffer lead-acid battery is presently available for approximately $200 to $300. A 500 AH battery weighs approximately 100 kg and takes a volume of 0.01 cubic meters or 10 liters. For a community of 100,000 consumers, the total volume of this buffer battery is 1000 cubic meters. This can be located underground in a substation, as it requires no maintenance. For example, at 500 square meters×2 meters, the initial investment cost would be $20 million. This cost would be amortized since duplicate and/or triplicate power supply lines are no longer necessary and peak load averaging can be applied.

The concept of buffered electricity is possible with a long-lasting, 20–25 years, lead-acid battery constructed in accordance with the invention.

Assuming a maximum deterioration of the anode of 1% per year into useless $PbO_2/PbS$ and with regular RPR constantly keeping the insulators unclogged, the serviceable lifetime of the battery can easily be extended beyond 25 years.

For non-electrified areas of the world this invention will also have far reaching results using solar cells as the power source for the battery. Attempts at using stationary lead-acid batteries have not been successful since the batteries deteriorate rapidly; typically within six months. This is due to the slow charge/discharge, the stationary situation of the battery and the length of time at the discharged state. These factors all promote the crystallization of $PbSO_4$. With the application of RPR, the battery can be kept in the substantially original condition for many years. This can result in electrification of many undeveloped areas of the world.

STRATEGIC DEFENSE

The significance of RPR can have a significant impact for military forces. Transportation vehicles generally use lead-acid batteries. Communication also depends on the availability of strong lead-acid batteries. With RPR, the problem of weak batteries can almost be resolved on the battlefield.

Assuming a vehicle needs a 30 AH battery with a cranking power of 1000 amps, a 60–100 AH battery is typically installed. This provides margins for a 1-year deterioration, so that the battery will not be undersized. RPR makes it possible for the battery to be constantly kept at original storage and cranking power.

Whether for military or civil use, the possibility of installing smaller and lighter batteries at a lower cost, increasing gas mileage and mobility of the vehicle becomes a reality. The reduced space and weight can then be used for other purposes.

ELECTRIC VEHICLES

Electric cars have generally proved unsuccessful since the lead-acid batteries soon become weak. Attempts are being made to design the ideal battery for the electrical car, involving highly dangerous and expensive materials, such as liquified hydrogen, hydrogen peroxide, titanium. None can match the performance of the traditional lead-acid battery. RPR applied to a lead-acid battery powered car can render electrical vehicles a reality. The battery can be subjected to controlled and automatic RPR. The lead-acid battery can be maintained at effective capacity for the life expectancy of the vehicle.

THE RESULTS OF RPR AND RPC

It is possible to obtain the following effects with the invented method:

1. Decontamination of a lead-acid battery by a Reverse Polarity Charge (RPR) dissolving lead sulfate crystals ($PbSO_4$).
2. Decontamination of a lead-acid battery by a Reverse Polarity Charge (RPR) dissolving deactivated lead dioxide ($PbO_2$) and thereby rinsing the insulators and plates.
3. Dissolving shortening conductive lead sulfate crystals ($PbSO_4$) by applying a reverse magnetic field—using either a Reverse Polarity Charge, RPR, or a Reverse Pulse Charge, RPC.
4. Restoring or maintaining the porosity of the insulators by applying a Reverse Polarity Charge, RPR, and/or a Reverse Pulse Charge, RPC.
5. Accelerating the decontamination of lead sulfate crystals ($PbSO_4$) and/or lead dioxide ($PbO_2$) by applying periodical strong discharges and charges.
6. Increasing the porosity of battery plate insulators by applying a reverse electrical current and/or magnetic field.
7. These processes of RPR and/or RPC could be applicable to other types of batteries.

ADVANTAGES

The two processes RPR and/or RPC provide for many possibilities:

1. Resuscitating old condemned lead-acid batteries, which now pose an environmental threat and health hazard. The working condition of the batteries is thus extended thereby giving these batteries a significantly extended life.
2. Making the electric automobile a practical reality, since the same battery can be used for the lifetime of the vehicle and can be kept charged at its substantially original capacity.
3. Utilizing smaller and lighter batteries in transportation vehicles, as the battery is always at a substantially full original capacity.
4. Energy utility companies can save enormous expenditure and labor. Lead-acid batteries, with a capacity to serve consumers when a contingency occurs, can be phased in within milliseconds using static inverters. The current practice of building duplicate or triplicate power lines and using spinning reserves to alleviate black-outs becomes unnecessary. The peak load problem could be eliminated by utilizing batteries as buffer storage.
5. Alternative power sources, such as solar, wind and tidal movement, become a practical source of electrical energy, as their power can now be stored in a long lasting lead-acid battery.
6. Developing batteries with symmetrical characteristics. In this sense, current batteries normally have a larger anode and a smaller cathode because of the general usage of the anode over time. With a battery constructed according to the present invention, the anode can be made smaller, namely closer, in size to the cathode. Then the battery size can overall be relatively smaller to effect the same long-term amount of energy delivery at full capacity. Such a battery would have a substantially symmetrical construction in that the anode and cathode are made equal in size and characteristics.

GENERAL

The invention includes within its scope at least the following characteristics.

a. A device and method for supplying RPC pulses through a battery to avoid the build-up of contaminants.

b. A device and method for supplying RPR through a battery to reverse the build-up of contaminants.

c. A device and method for supplying RPRF through a battery to reverse the build-up of contaminants.

d. A battery in a symmetrical form layout to allow for the best possible results of RPR, and to optimize the results of this process.

e. A battery constructed and prepared for future RPR, RPC or RPRF.

Many more variations of the invention exist each differing from the other in matters of detail only. Although the invention is described largely in relation to lead-acid storage batteries and Ni-CD batteries, the invention has application to other types of electric accumulators. For instance, there are alkaline type storage batteries, such as nickel-iron, nickel-cadmium, silver-zinc, and silver-cadmium batteries. The invention is equally applicable to such batteries. Further, although the electrolyte has been described as sulfuric acid, other electrolytes can be used. The electrolytes can be in liquid, gel, solid or partly solid form. The nature and the kind of the electrolyte can be those that are typically in use for different secondary batteries with the different electrode combinations described. Also, the recharging can be effected in accordance with the invention in a manner described and then the cathode and anode terminals switched for the second mode. Alternatively, the switching of terminals into the second mode can be effected and the recharging effected such that this is effected as if the cathode and the anode are in the first mode. Thus, there is no limitation on the sequence in the claims.

What is claimed is:

1. A method of treating a lead-acid battery, the battery including a casing containing, for operation in a first operational mode, a first anode of a first anode material for operation in a first anode mode, a first cathode of a first cathode material for operation in a first cathode mode, an insulator between the first cathode and the first anode, an electrolyte, a first cathode terminal from the first cathode, and a first anode terminal from the first anode, the terminals being for normally connecting a load to the battery in a first operational mode for applying power from the battery to the load, the treatment comprising the steps of:

applying for a predetermined time a charging current to the respective terminals such that a voltage for applying the charging current is directed so that a positive terminal of a charging input is applied to the first cathode terminal, and a negative terminal of the charging input is applied to the first anode terminal, and establishing the first cathode terminal as a second anode terminal and the first anode terminal as a second cathode terminal for operation of the battery on a load in a second operational mode, wherein in such second operational mode the anode and the cathode are switched relative to the anode and cathode of the first operational mode, and in such second operational mode the battery is for supplying power to a load.

2. A method as claimed in claim 1 wherein, after an operating cycle in the second mode, applying for a predetermined time, a charging current to the respective terminals such that a voltage for applying the charging current is directed so that the positive terminal of the charging input is applied to the second cathode terminal, and the negative terminal of the charging input is applied to the second anode terminal, and establishing the second cathode terminal as a third anode terminal and the second anode terminal as a third cathode terminal whereby the battery is again operable in the first mode.

3. A method as claimed in claim 2 including repetitively charging the battery after its operational mode by connecting the positive terminal of the charging input to the terminal which immediately previously acted as an effective cathode terminal and the negative terminal of the charging input to the anode terminal immediately which immediately previously acted as an effective anode terminal.

4. A method as claimed in claim 1 wherein, when a discharge of the battery is effected in the operational mode through a load connected between the first anode terminal and the first cathode terminal, the electrolyte effects an electrochemical change at least on one of the anode, cathode or the insulator, and wherein an electrolytic contaminant solid is deposited within the battery, and wherein the application of the charging current at least in part dissolves the contaminant product.

5. A method as claimed in claim 1 wherein, when a discharge of the battery is effected in the operational mode through a load connected between the first anode terminal and the first cathode terminal, the electrolyte effects an electrochemical change at least on one of the anode, cathode or the insulator, and wherein an electrolytic contaminant solid is deposited within the battery, and wherein the application of the charging current at least in part removes the contaminant product.

6. A method as claimed in claim 4 wherein the contaminant product is selectively dissolved, at least from one of the insulator, the cathode or the anode.

7. A method as claimed in claim 5 wherein the contaminant product is selectively removed, at least from one of the insulator, the cathode or the anode.

8. A method as claimed in claim 1 wherein the first anode material is lead, the first cathode material lead, the electrolyte is sulfuric acid, and wherein a contaminant, as a result of battery operation, includes lead sulfate crystals.

9. A method as claimed in claim 1 wherein the insulator includes a material having a defined porosity, and wherein operation of the battery under load or discharge causes the porosity to decrease, and wherein applying the charging increases the porosity.

10. A method as claimed in claim 1 including defining the first anode terminal and the first cathode terminal to be the cathode terminal and the anode terminal respectively, and then effecting charging such that the first cathode terminal is connected for charging to the positive terminal of the charging input and the first anode terminal is connected to the negative terminal of the charging input.

11. A method as claimed in claim 10 including periodically reversing the definition of the respective terminals, after charging indicates a residual power in the battery below a first predetermined level such first predetermined level being a low operational level.

12. A method as claimed in claim 10 including periodically reversing the definition of the respective terminals after charging indicates a residual power in the battery below a second predetermined level above a low operational level.

13. A method as claimed in claim 10 including periodically reversing the definition of the respective terminals after a predetermined time of operating in a first mode.

14. A method as claimed in claim 1 including prior to applying a charging current, the battery is discharged for a first time period.

15. A method as claimed in claim 1 wherein prior to applying a charging current, the battery is discharged in a first time stage and a second time stage.

16. A method as claimed in claim 1 wherein charging is effected in two stages, such stages being a first stage for a first time at a first charge level, and a second time stage at a second charge level.

17. A method as claimed in claim 1 including, after effecting charging, repetitively discharging and recharging the battery for relatively short time intervals and thereafter operating the battery in the second mode.

18. A method as claimed in claim 1 wherein, the second operational mode is not a recharge mode and such second operational mode operates with a power level about equal to the first operational mode.

19. A method of treating a lead-acid battery, the battery in a first operational mode being for applying power from the battery to a load, the battery including a casing containing, first anode lead plates, first cathode lead plates respectively, insulators between the respective first cathode plates and the first anode plates, electrolyte, and the treatment comprising the steps of:

applying a charging current of duration sufficient to recharge the battery for use in a second operational mode to the respective anode and cathode such that a voltage for applying the charging current is directed so that a positive supply of a charging input is applied to the first cathode, and a negative supply of the charging input is applied to the first anode, and establishing the first cathode as a second anode and the first anode as a second cathode terminal for operation of the battery in a second operational mode, wherein in such second operational mode the anode and the cathode are switched relative to the anode and cathode of the first operational mode, and in such second operational mode the battery is for supplying power to a load, and such second operational mode operates with a power level about equal to the first operational mode.

20. A method as claimed in claim 19 wherein, after an operating cycle in the second mode, applying a charging current to the respective electrodes such that a voltage for applying the charging current is directed so that the positive supply of the charging input is applied to the second cathode, and the negative supply of the charging input is applied to the second anode, and establishing the second cathode as a third anode and the second anode as a third cathode whereby the operative mode is again the first mode.

21. A method as claimed in claim 20 including repetitively charging the battery after its operational mode by connecting the positive of the charging input to the which immediately previously acted as an effective cathode and the negative of the charging input to the anode which immediately previously acted as an effective anode.

22. A method as claimed in claim 19 wherein the electrolyte is sulfuric acid, and when a discharge of the battery is effected in the operational mode through a load connected between the first anode and the first cathode, the electrolyte effects an electrochemical change at least on one of the anode, cathode or the insulator, and wherein a lead sulfate crystal electrolytic contaminant solid is deposited within the casing, and wherein the application of the charging current, at least in part, dissolves the contaminant product.

23. A method as claimed in claim 19 including periodically reversing the respective electrodes, after charging indicates a residual power in the battery below a first predetermined level such first predetermined level being a low operational level.

24. A method as claimed in claim 19 including periodically reversing the respective electrodes after a predetermined time of operating in a first mode.

25. A method as claimed in claim 19 including prior to applying a charging current, the battery is discharged for, at least, a first time period.

26. A method as claimed in claim 19 wherein charging is effected in two stages, such stages being a first stage for a first time at a first charge level, and a second time stage at a second charge level.

27. A method as claimed in claim 19 including, after effecting charging, repetitively discharging and recharging the battery for relatively short time intervals and thereafter operating the battery in the second mode.

28. A method as claimed in claim 19 wherein, the second operational mode is not a recharge mode.

29. A method of treating a lead-acid battery for operation in a first operational mode for applying power from the battery to a load, the battery including a first anode, a first cathode, and an insulator between the first cathode and the first anode, an electrolyte, wherein the treatment comprising the steps of:

applying a charging current so that a positive supply of a charging input is applied to the first cathode, and a negative supply of the charging input is applied to the first anode, said charging current being of duration sufficient to recharge the battery for use in a second operational mode, and establishing the first cathode as a second anode and the first anode as a second cathode for operation of the battery on a load in a second operational mode, wherein, in such second operational mode, the anode and the cathode are switched relative to the anode and cathode of the first operational mode, and in such second operational mode the battery is for supplying power to a load.

30. A method as claimed in claim 29 wherein, after an operating cycle in the second operational mode, a charging current is applied to the respective electrodes such that a voltage for applying the charging current is directed so that the positive supply of the charging input is applied to the second cathode, and the negative supply of the charging input is applied to the second anode terminal, and establishing the second cathode as a third anode and the second anode as a third cathode whereby the battery is again operable in the first operational mode.

31. A method as claimed in claim 29 wherein the first anode is lead covered with lead dioxide during charging, the first cathode material is lead covered with lead sulfate during discharging, the electrolyte is sulfuric acid, and wherein a contaminant as a result of battery operation includes lead sulfate crystals.

32. A method as claimed in claim 29 wherein the insulator includes a material having a defined porosity, and wherein operation of the battery under load causes the porosity to decrease, and wherein applying the charging increases the porosity.

33. A method as claimed in claim 29 wherein, the second operational mode is not a recharge mode and is substantially similar to the first operational mode.

34. A method of treating a lead-acid battery, the battery in a first operational mode being for applying power from the battery to a load, the battery including a casing containing, a first anode of a first anode material for operation in a first anode mode, a first cathode of a first cathode material for operation in a first cathode mode, an insulator between the first cathode and the first anode, an electrolyte, a first cathode terminal from the first cathode, and a first anode terminal from the first anode, the terminals being for normally connecting a load to the battery in the first mode, the treatment comprising the steps of:

establishing the first cathode terminal as a second anode terminal and the first anode terminal as a second cathode terminal for operation of the battery on a load in a second operational mode, wherein, in such second operational mode, the anode and the cathode are switched relative to the anode and cathode of the first operational mode, and in such second operational mode the battery is for supplying power to a load, and applying for a predetermined time a charging current of duration sufficient to recharge the battery for use in a second operational mode to the respective terminals such that a voltage for applying the charging current is directed so that a positive terminal of a charging input is applied to the first cathode terminal, and a negative terminal of the charging input is applied to the first anode terminal.

35. A method as claimed in claim 34 wherein, the second operational mode is substantially similar to the first operational mode.

36. A method of treating a lead-acid battery, the battery including a casing containing, for operation in a first operational mode, a first anode of a first anode material for operation in a first anode mode, a first cathode of a first cathode material for operation in a first cathode mode, an insulator between the first cathode and the first anode, an electrolyte, a first cathode terminal from the first cathode, and a first anode terminal from the first anode, the terminals being for normally connecting a load to the battery in a first operational mode for applying power from the battery to the load, the treatment comprising the steps of:

applying for a predetermined time a charging current to the respective terminals such that a voltage for applying the charging current is directed so that a positive terminal of a charging input is applied to the first cathode terminal, and a negative terminal of the charging input is applied to the first anode terminal, and selectively (a) operating the battery in the first operational mode, and (b) establishing the first cathode terminal as a second anode terminal and the first anode terminal as a second cathode terminal for operation of the battery on a load in a second operational mode, wherein in such second operational mode the anode and the cathode are switched relative to the anode and cathode of the first operational mode, and in such second operational mode the battery is for supplying power to a load.

37. A method as claimed in claim 36 wherein, the second operational mode is not a recharge mode and is substantially similar to the first operational mode.

38. A method of treating a lead-acid battery, the battery including a casing containing, for operation in a first operational mode, a first anode of a first anode material for operation in a first anode mode, a first cathode of a first cathode material for operation in a first cathode mode, an insulator between the first cathode and the first anode, an electrolyte, a first cathode terminal from the first cathode, and a first anode terminal from the first anode, the terminals being for normally connecting a load to the battery in a first operational mode for applying power from the battery to the load, the treatment comprising the steps of:

applying for a predetermined time a charging current to the respective terminals, and establishing the first cathode terminal as a second anode terminal and the first anode terminal as a second cathode terminal for operation of the battery on a load in a second operational mode, wherein in such second operational mode the anode and the cathode are switched relative to the anode and cathode of the first operational mode, and in such second operational mode the battery is for supplying power to a load.

39. A method as claimed in claim 38 wherein, the second operational mode is not a recharge mode and is substantially similar to the first operational mode.

\* \* \* \* \*